United States Patent
Merrill

(10) Patent No.: US 7,058,996 B1
(45) Date of Patent: Jun. 13, 2006

(54) TOILET LIFTING AND TRANSPORT DEVICE AND METHOD

(76) Inventor: Dennis A. Merrill, 2700 E. Sunset Rd. #11, Las Vegas, NV (US) 89120

( * ) Notice: Subject to any disclaimer, the term of this patent is extended or adjusted under 35 U.S.C. 154(b) by 0 days.

(21) Appl. No.: 11/043,781

(22) Filed: Jan. 25, 2005

Related U.S. Application Data

(63) Continuation-in-part of application No. 10/859,690, filed on Jun. 3, 2004, now Pat. No. 6,886,192.

(51) Int. Cl.
*A47K 4/00* (2006.01)
*B60P 1/10* (2006.01)

(52) U.S. Cl. .............................. 4/661; 254/7 R; 269/17

(58) Field of Classification Search .................... 4/661; 254/7 R, 323–324; 269/17
See application file for complete search history.

(56) References Cited

U.S. PATENT DOCUMENTS

| | | | |
|---|---|---|---|
| 3,262,590 A | 7/1966 | Lynn | |
| 3,391,905 A | 7/1968 | Burns | |
| 4,084,706 A * | 4/1978 | Russell | ........................ 414/460 |
| 4,239,443 A * | 12/1980 | Rysewyk | ..................... 414/618 |
| 4,722,511 A | 2/1988 | Chitwood | |
| 5,203,065 A | 4/1993 | Peters | |
| 5,373,593 A | 12/1994 | Decky et al. | |
| 5,505,430 A | 4/1996 | Barnett | |
| 5,556,076 A | 9/1996 | Jacquay | |
| 6,015,137 A | 1/2000 | Guevara et al. | |
| 6,685,170 B1 | 2/2004 | Gwynn | |
| 6,752,379 B1 | 6/2004 | Wall | |

* cited by examiner

*Primary Examiner*—Charles E. Phillips
(74) *Attorney, Agent, or Firm*—Greenberg Traurig, LLP; Rob L. Phillips

(57) ABSTRACT

A toilet lifting and transport device. The device has forward legs and rear legs, with the forward legs being selectively deployable in an open configuration for lifting and transporting use, and a closed configuration for storage. A screw lift is positioned on at least one horizontal support that is positioned between the rear legs. The lifting device is coupled to a toilet fixture via a tank strap and bridge straps. Lifting of the toilet fixture is then accomplished utilizing the screw lift. Transport of the lifting device with the toilet fixture thereon is accomplished by rolling the lifting device on wheels located on the bottoms of the rear and forward legs. An alternative design utilizing the same lifting and transport principle is also disclosed.

12 Claims, 5 Drawing Sheets

TOILET LIFTING AND TRANSPORT DEVICE AND METHOD

CROSS-REFERENCE TO RELATED APPLICATIONS

This application is a continuation-in-part of application Ser. No. 10/859,690 filed Jun. 3, 2004 now U.S. Pat. No. 6,886,192.

FIELD OF THE INVENTION

This invention relates generally to the field of toilet lifting and transport devices and, more specifically, to a collapsible and relatively simple device for lifting and transporting a toilet.

BACKGROUND OF THE INVENTION

A toilet fixture, consisting essentially of a tank and a bowl, is a relatively heavy and cumbersome object. It can be difficult to lift and move, particularly for an individual working without assistance from a partner.

Over the years, there have been a number of attempts to develop a suitable lifting and transport device for toilets. Examples include the devices shown in U.S. Pat. No. 3,262,590 (Lynn); U.S. Pat. No. 3,391,905 (Burns); U.S. Pat. No. 4,722,511 (Chitwood); U.S. Pat. No. 5,203,065 (Peters); U.S. Pat. No. 5,373,593 (Decky); U.S. Pat. No. 5,556,076 (Jacquay); U.S. Pat. No. 6,015,137 (Guevara); and U.S. Pat. No. 6,685,170 (Gwynn).

However, prior art devices have tended to be relatively complicated, with a significant number of moving parts. They are typically also bulky, and do not collapse for transport (without a toilet thereon) or storage. (Collapsibility for storage can be particularly important to a person who is conducting repair work on his or her own home, and who may be interested in utilizing such a device a single time, and who will thereafter want to be able to readily store it for possible future use.) Likely for many of these reasons, prior art devices as described herein have not achieved broad acceptance within the field.

A need exists for a toilet lifting and transport device that is relatively simple in terms of its construction and use, and that is collapsible for transport to or from a job and for storage. The present invention satisfies these needs and provides other related advantages.

SUMMARY OF THE INVENTION

In accordance with one embodiment of the present invention, a toilet lifting and transport device is disclosed. The device comprises, in combination: at least one horizontal support; a screw lift coupled to the at least one horizontal support; bridge straps coupled at a first end thereof to the screw lift; clasping elements coupled at a second end of the bridge straps; two rear legs substantially co-planar with the horizontal support; a wheel locate don a bottom end of each of the two rear legs; a toilet tank strap located proximate the horizontal support and adapted to be positioned around a toilet tank; forward legs adapted to selectively occupy an open configuration at a substantially right angle to the horizontal support and a collapsed configuration substantially co-planar with the horizontal support; and a wheel located on a bottom end of each of the two forward legs.

In accordance with another embodiment of the present invention, a toilet lifting and transporting device is disclosed. The device comprises, in combination: a first horizontal support; a second horizontal support located below the first horizontal support; a handle located above each of the first horizontal support; a screw lift coupled to each of the first and the second horizontal supports; bridge straps coupled at a first end thereof to the screw lift; clasping elements coupled at a second end of the bridge straps; two rear legs substantially co-planar with the horizontal support; a wheel located on a bottom end of each of the two rear legs; a toilet tank strap located proximate the horizontal support and adapted to be positioned around a toilet tank; forward legs adapted to selectively occupy an open configuration at a substantially right angle to the horizontal support and a collapsed configuration substantially co-planar with the horizontal support; and a wheel located on a bottom end of each of the two forward legs.

In accordance with another embodiment of the present invention, a toilet lifting and transporting device is disclosed. The device comprises, in combination: a first horizontal support; a second horizontal support located below the first horizontal support; a screw lift proximate the first horizontal support and coupled to the second horizontal support; a handle at a top end of the screw lift; a lifting strap secured at its approximate midpoint to said lifting screw; clasping elements coupled to each end of the lifting strap; two rear legs and two forward legs hingedly attached proximate to bottom ends of a vertical support; two adjustable forward legs; wheels positioned at ends of the two rear legs and the two forward legs; and a toilet tank strap located proximate the second horizontal support and adapted to be positioned around a toilet tank.

In accordance with a further embodiment of the present invention a method for lifting and transporting a toilet is disclosed. The method comprises the steps of: providing a toilet lifting and transport device comprising, in combination: at least one horizontal support; a screw lift coupled to the at least one horizontal support; bridge straps coupled at a first end thereof to the screw lift; clasping elements coupled at a second end of the bridge straps; two rear legs substantially co-planar with the horizontal support; a wheel located on a bottom end of each of the two rear legs; a toilet tank strap located proximate the horizontal support and adapted to be positioned around a toilet tank; forward legs adapted to selectively occupy an open configuration at a substantially right angle to the horizontal support and a collapsed configuration substantially co-planar with the horizontal support; and a wheel located on a bottom end of each of the two forward legs; providing a toilet fixture having a tank, a bowl, and a bridge between the tank and the bowl; placing the toilet lifting and transport device in the open configuration; positioning the toilet lifting and transport device over a toilet so that the bowl is located between the forward legs and so that the horizontal support is contacting the tank; coupling the clasping elements to the bridge; activating the screw lift in a direction that will cause the toilet fixture to be lifted; and transporting the toilet lifting and transport device, with the toilet fixture coupled thereto by causing the toilet lifting and transport device to roll on the wheels.

DETAILED DESCRIPTION OF THE PREFERRED EMBODIMENTS

Figure 1:
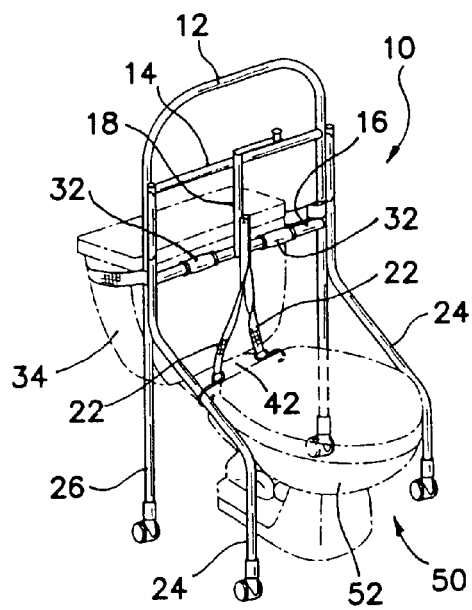
FIG. 1 is a perspective view showing a device consistent with an embodiment of the present invention in position on a toilet, with the toilet on the ground.
Figure 2:
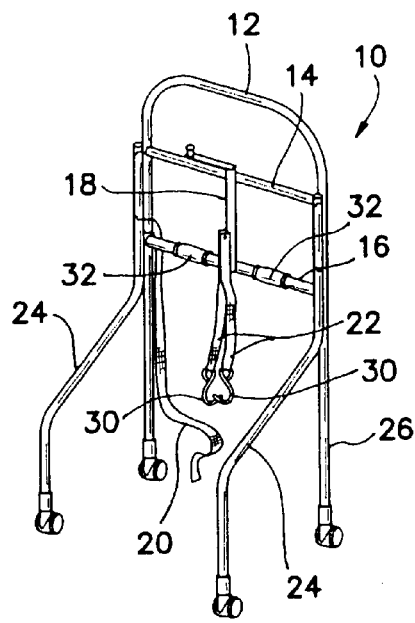
FIG. 2 is a perspective view showing a device consistent with an embodiment of the present invention, configured for use.
Figure 2A:
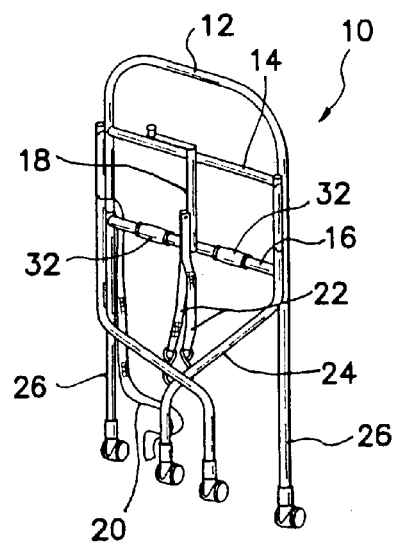
FIG. 2A is a perspective view showing the device of FIG. 2 in a collapsed configuration.

Referring first to FIGS. 1–2A, the main elements of a toilet lifting and transport device (herein "lifting device 10") consistent with the present invention are shown moving from the top of the lifting device 10 down, it can be seen that in this embodiment, the lifting device 10 features a handle 12, a first horizontal support 14, a second horizontal support 16, a screw lift 18, a tank strap 20, bridge straps 22, forward legs 24 and rear legs 26. These elements, and their functions, will now be described in additional detail.

The screw lift 18 is preferably attached to each of the first horizontal support 14 and the second horizontal support 16. The bridge straps 22 are attached at a first end thereof to the screw lift 18. They may be moved upward or downward, as desired, by turning of the screw lift handle 28. Turning in a first direction will cause upward movement of the bridge straps 22, while turning in an opposite second direction will cause downward movement of the bridge straps 22. Coupling hooks 30 are located on a second end of the bridge straps 22.

Preferably, the second horizontal support 16 has padding thereon, and preferably has two tank pads 32 as shown in FIGS. 1–2A. Because the second horizontal support 16 will contact the toilet tank 34 during use, the tank pads 32 can prevent scratching or marking of the toilet tank 34 during lifting and/or transport, and can also facilitate improved grasping of the toilet tank 34 during such operations.

Figure 3:
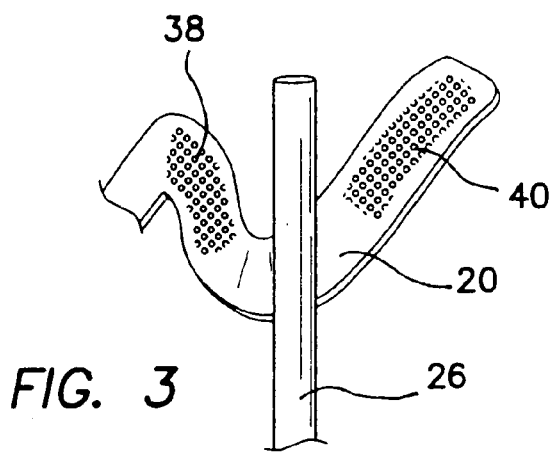
FIG. 3 is a front view of the end portion of a tank strap element of a device consistent with an embodiment of the present invention, showing opposing hook and loop covered surfaces.
Figure 3A:
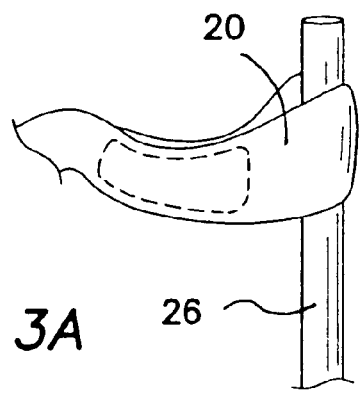
FIG. 3A is a front view of the end portion of the tank strap element of FIG. 3, in a coupled configuration.
Figure 4:
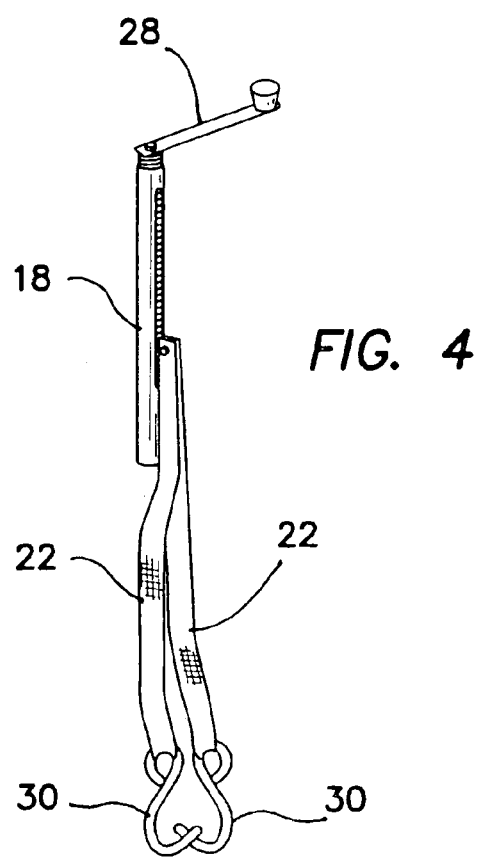
FIG. 4 is a front view of a screw lift element of a device consistent with an embodiment of the present invention.

Preferably, a tank strap 20 is provided. The tank strap 20 should be coupled at a first end thereof to a first side of the lifting device 10, and preferably to a one of the rear legs 26 at a point that is proximate the second horizontal support 16. Referring now to FIGS. 3–3A, it is preferred that the second end of the tank strap 20 should have opposing areas of hook material 38 and loop material 40. In this configuration, as shown in FIG. 3A, the second end of the tank strap 20 can be fastened around a side of the lifting device 10. Preferably this is accomplished by fastening the second end of the tank strap 20 around a second side of the lifting device 10, and preferably about the other rear leg 26. (It should be noted that it may be desired to provide a tank strap 20 of sufficient length to permit its second end it to be fastened around the same rear leg 26 to which the first end of is coupled, or event to permit additional wrapping.)

The coupling hooks 30 located on a second end of the bridge straps 22 are adapted to be received in recessed areas that are typically found in an underside of the bridge 42 portion of a toilet fixture 50. The coupling 30 are intended to represent one embodiment of a bridge clasping element for the second end of the bridge straps 22. Other embodiments may be possible. For example, it may be desired to provide opposing hook and loop material areas on the second ends of the two bridge straps 22, and to couple these areas below the bridge for lifting and transport of the toilet fixture 50.

Figure 1A:
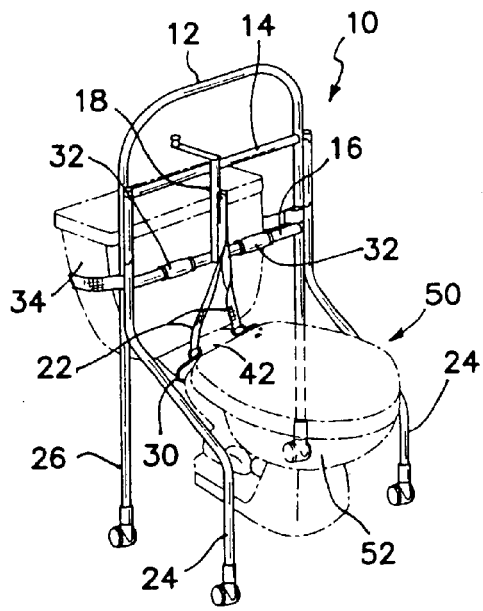
FIG. 1A is a perspective view showing a device consistent with an embodiment of the present invention in position on a toilet, with the toilet in a lifted position.

Referring now to FIGS. 2–2A, open and collapsed configurations of the lifting device 10 are shown. In the open configuration, forward legs 24 are deployed at a substantially right angle to the handle 12, and first and second horizontal supports 14 and 16. In this configuration, as shown in FIGS. 1–1A, the lifting device may be positioned over a toilet fixture 50, with the bowl 52 portion of the toilet fixture 50 between the forward legs 24.

As shown in FIG. 2A, in a collapsed configuration, the forward legs 24 are in a folded or collapsed configuration. In this configuration, the forward legs 24 are substantially co-planar with the handle 12, first and second horizontal supports 14 and 16, and the rear legs 26. It should also be noted that the forward legs 24, in the open configuration, preferably project at a substantially right angle relative to the second horizontal support 16 in a forward direction, an extend initially in a downward direction at an acute angle. The forward legs 24 then, preferably, curve downward so that a lower portion thereof, in the open configuration, is substantially parallel to rear legs 26.

Preferably, through a spring loaded mechanism, the use of pins or screws, or otherwise, the forward legs 24 are permitted to lock into either an open configuration (e.g., FIG. 2) or a collapsed configuration (e.g., FIG. 2A). Particularly with regard to the open configuration, positively locking of the forward legs 24 can eliminate the risk of buckling or collapse of the lifting device 10 during use.

Each of the forward legs 24 and rear legs 26 should have a wheel 44 thereon. At least two and preferably all the wheels 44 should be freely rotatable relative to the leg to which they are coupled, so that rolling of the lifting device 10 with a toilet fixture 50 thereon can proceed in any desired direction—in other words, so that steering of the lifting device 10 is facilitated. It may further be desired to provide a braking element on one or more of the wheels 44, so that the lifting device 10 can be secured in position with a toilet fixture 50 thereon.

Preferably, the lifting device 10 has a slight forward lean, so that the weight of the toilet fixture 50 can be more evenly distributed among the four wheels 44.

It should be noted that the frame components of the lifting device 10 (including the handle 12, first and second horizontal supports 14 and 16, and forward and rear legs 24 and 26 are preferably formed of a high strength material, such as tubular steel.

Statement of Operation

In order to utilize the lifting device 10 of the present invention, it is first necessary to position it in an open configuration, with the forward legs 24 at a substantially right angle to the second horizontal support 16. The lifting device 10 should then be positioned over a toilet fixture 50 until arriving at the position shown in FIG. 1, with the tank pads 32 contacting the tank 34 and the bowl 52 located between the forward legs 24. The tank strap 20 should be coupled around the tank 34, and fastened around the lifting device 10 in a relatively snug manner.

As shown in FIG. 1, the coupling hooks 30 should be attached to the underside of bridge 42. (The bridge and tank coupling steps can proceed in any desired order.) Once the tank 34 and bridge 42 are coupled to the lifting device 10, the screw lift handle 28 should be turned in the direction that will raise the toilet fixture 50 off of the ground. The user should then grasp the handle 12 (if provided) and roll the lifting device 10 in the desired direction, steering as necessary. When the desired destination is reached, the user should turn the screw lift handle 28 in the lowering direction, and lower the toilet fixture 50 until it is fully-lowered. At that point, the tank strap 20 and coupling hooks 30 may be detached from the toilet fixture 50, and the lifting device 10 removed therefrom.

To collapse the lifting device 10 for storage, the forward legs 24 are positioned, as shown in FIG. 2A, so that they are substantially co-planar with the second horizontal support 16.

Now referring to FIGS. 5 and 6, an alternative embodiment of a lifting device 100 comprises a frame 110 having a first horizontal support 120, a second horizontal support 130 below the first horizontal support 120 and vertical supports 140. Horizontal leg supports 150 attached to a lower portion of each of the vertical supports 140 accepts attachment means 160 for attaching rear legs 170 and forward legs 180 thereto. Ideally, both the rear legs 170 and forward legs 180 are rotatably attached to horizontal leg supports 150. The attachment means 160 may comprise hinges, pins or related devices which allow the legs to partially rotate about the horizontal leg support 150 as described in more detail below. Alternatively, the rear legs 170 and forward legs 180 may be rotatably attached to a bottom of the vertical supports 140 directly thereby eliminating the need for the horizontal leg supports 150. Fixed wheels 190 are attached to the rear legs 170 and swivel wheels 200 are attached to the forward legs 180. The swivel wheels 200 provide steering capability for the device 100 and toilet being transported.

In a manner similar to the embodiment shown in FIGS. 1–5, a screw lift 210 is coupled at a first end 215 to the second horizontal support 130. A functioning handle 220 is coupled at a second end 225 of the screw lift 210. As shown clearly in FIGS. 5 and 7, the screw lift 210 extends vertically from the second horizontal support 130 at a slight angle until the second end 225 extends beyond the first horizontal support 120. In this arrangement, the handle 220 is readily accessible by a user and clear of the first horizontal support 120. While not shown, it is also possible to form the first horizontal support 120 with a slight curve or bend in the horizontal plane so the screw lift 210 may be positioned parallel to the vertical supports 140. A lifting strap 230 is joined at its approximate midpoint to a screw lift projection 240. Clasping elements 250 are fixed to both ends of lifting strap 230.

A toilet tank securing strap 245 is releasably securable to the vertical supports 140. Hook and loop fasteners (i.e., Velcro®), buttons, clasps and zippers may provide means for releasably securing the strap 245 to the vertical supports 140. Based on the conventional size of toilets, in most instances, the toilet tank securing strap 245 is secured to the vertical supports 140 proximate the second horizontal support 130. A pair of soft rollers 255 resides on the second horizontal support 130.

Figure 5:
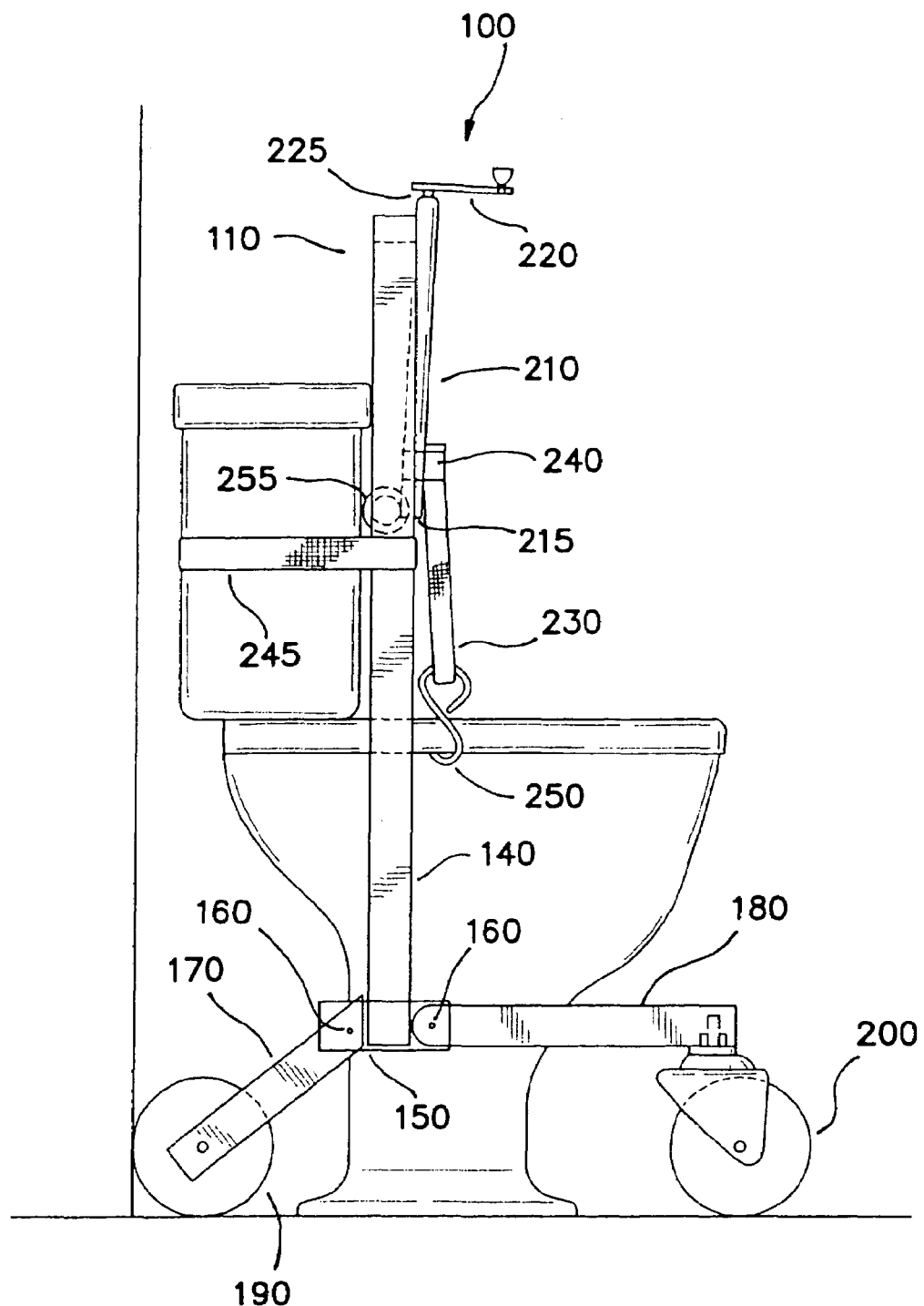
FIG. 5 is a side view showing a device consistent with an alternative embodiment of the present invention, configured for use.
Figure 6:
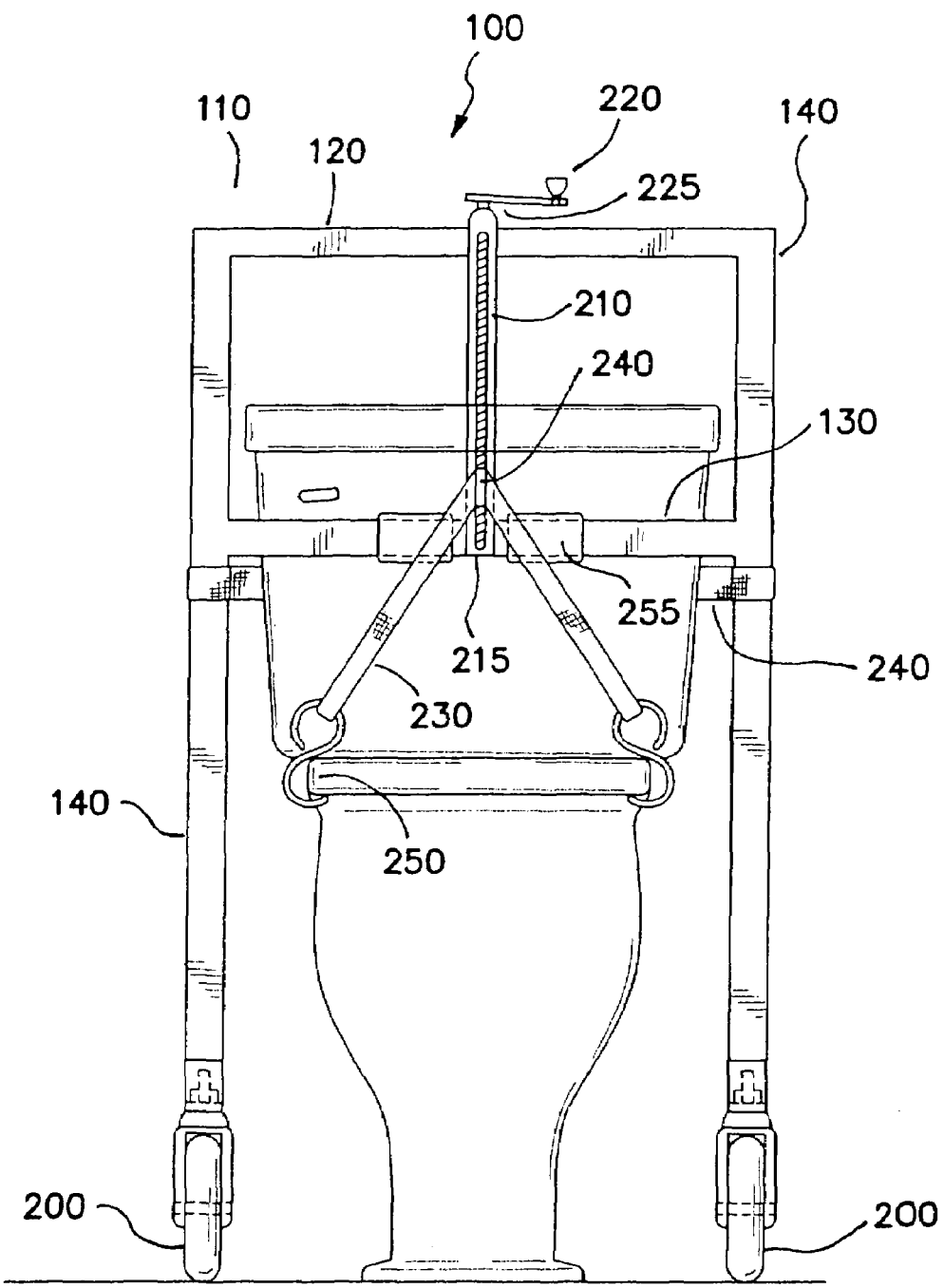
FIG. 6 is a front view showing the device consistent with the alternative embodiment of the present invention as shown in FIG. 5, configured for use.

As illustrated in FIGS. 5 and 6, in preparation for transporting a toilet using the device 100, the vertical supports 140 are positioned on opposite sides of the toilet, the clasping elements 250 of the lifting strap 230 are secured to the toilet bowl (e.g., underneath a bridge portion of the toilet) and the toilet tank securing strap 245 is positioned around the toilet tank. Then, the handle 220 is turned thereby raising the lifting strap 230 and toilet. The soft rollers 255 protect the toilet tank from any damage which may be caused by the device 100 caused during transport.

Figure 7:
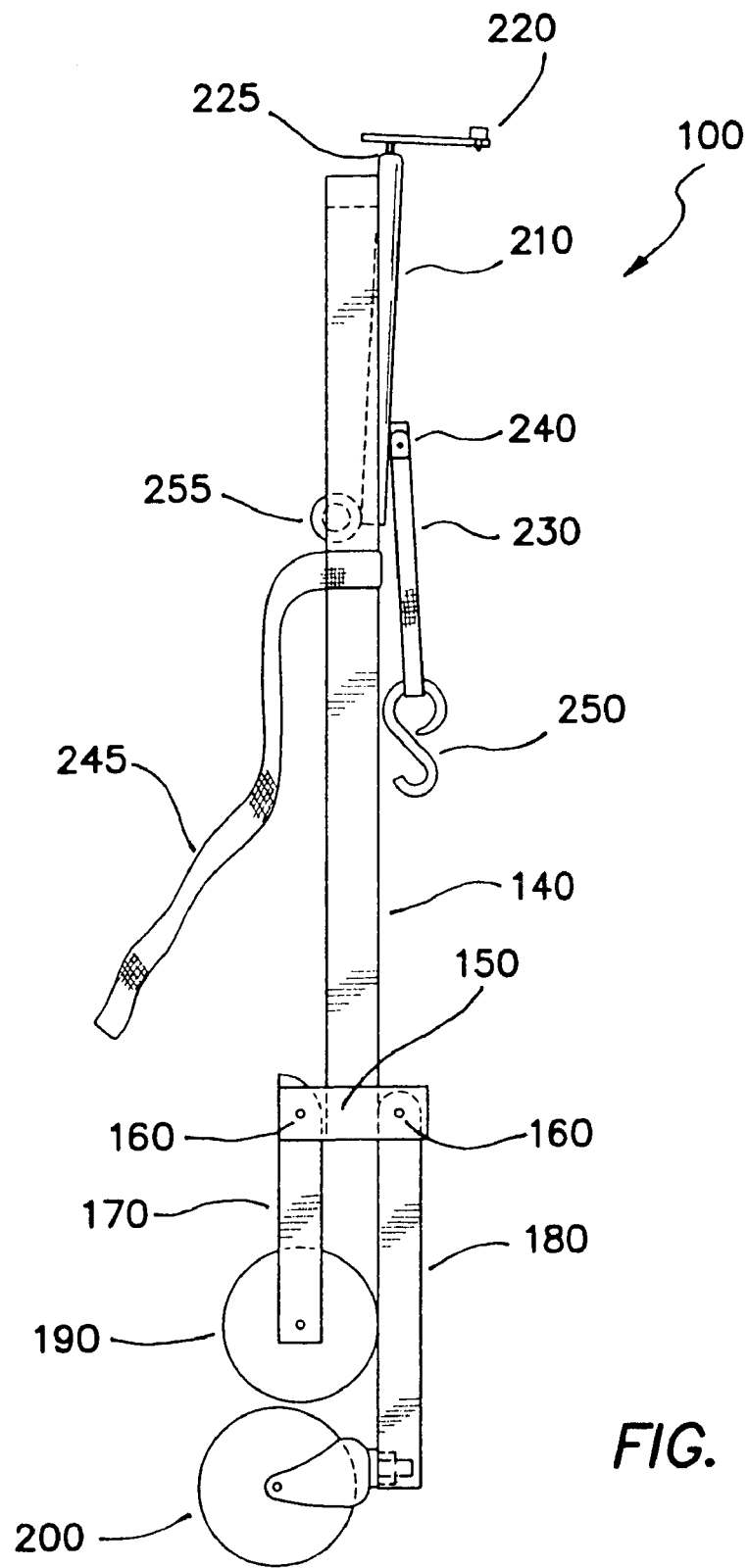
FIG. 7 is a side view showing the device consistent with the alternative embodiment of the present invention of FIGS. 5–6, in a collapsed configuration.

During non-use, the device is collapsed, as shown in FIG. 7, for easy handling and storage. The collapse of the device 100 is automatic in the sense that gravity causes the rear legs 170 and forward legs 180 to simply rotate in a downward direction about the attachment means 160 such that they are aligned generally parallel to the vertical supports 140. Alternatively, the legs 170, 180 may be locked in place during use such that they must be unlocked for rotation into an ideal position during non-use. Stops or locks integrated in the horizontal leg supports 150 or attachment means 160 prohibit the legs 170, 180 from rotating beyond a generally parallel alignment with a floor surface during use and beyond a parallel alignment with the vertical supports 140 during non-use. In other words, when viewing FIG. 7, the rear legs 170 are capable of rotating between approximate 6 o'clock and 9 o'clock positions and the forward legs 180 are capable of rotating between approximate 3 o'clock and 6 o'clock positions.

While the invention has been particularly shown and described with reference to preferred embodiments thereof, it will be understood by those skilled in the art that the foregoing and other changes in form and details may be made therein without departing from the spirit and scope of the invention. For example, it may be possible to eliminate the first horizontal support 14, perhaps by providing a wider second horizontal support 16. It may also be possible to eliminate the handle 12, with movement of the lifting device 10 and toilet fixture 50 being accomplished by grasping the toilet fixture 50 or some other component of the lifting device 10.

I claim:

1. A toilet lifting and transport device comprising:
   a frame having at least one horizontal support, said at least one horizontal support extending between a pair of vertical supports;
   a screw lift having a first end coupled to said at least one horizontal support;
   a lifting strap coupled at its approximate midpoint to said screw lift;
   clasping elements coupled at both ends of said lifting strap;
   a toilet tank strap adapted to be positioned around a toilet tank;
   two rear legs rotatably joined to said frame;
   two forward legs rotatably attached to said frame; and
   wheels joined to both the rear legs and the forward legs.

2. The toilet lifting and transport device of claim 1 further comprising a handle affixed to a second end of the screw lift.

3. The toilet lifting and transport device of claim 1 wherein a first end of said toilet tank strap is releasably attached to a first vertical support and a second end of said toilet tank strap is releasably attached to a second vertical support.

4. The toilet lifting and transport device of claim 1 wherein the rear legs and forward legs are rotatably attached to horizontal members located at a bottom of said vertical supports.

5. The toilet lifting and transport device of claim 1 wherein the wheels joined to the forward legs are capable of swiveling.

6. The toilet lifting and transport device of claim 1 further comprising two horizontal supports.

7. The toilet lifting and transport device of claim 1 further comprising a soft roller covering a portion of said second horizontal support.

8. A toilet lifting and transport device comprising:
   a frame having a first horizontal support and a second horizontal support positioned below said first horizontal support, said first and second horizontal supports extending between a pair of vertical supports;
   a screw lift having a first end coupled to said second horizontal support;
   a lifting strap coupled at its approximate midpoint to said screw lift;
   clasping elements coupled at both ends of said lifting strap;
   a toilet tank strap adapted to be positioned around a toilet tank;
   two rear legs rotatably joined to horizontal leg supports attached to a bottom of the vertical supports;
   two forward legs rotatably attached to said horizontal leg supports attached to the bottom of the vertical supports;
   fixed wheels joined to the rear legs; and
   swivel wheels joined to the forward legs.

9. The toilet lifting and transport device of claim 8 further comprising a handle affixed to a second end of the screw lift.

10. The toilet lifting and transport device of claim 8 wherein a first end of said toilet tank strap is releasably attached to a first vertical support and a second end of said toilet tank strap is releasably attached to a second vertical support.

11. The toilet lifting and transport device of claim 8 further comprising a soft pad covering a portion of said second horizontal support.

12. A method of lifting and transporting a toilet comprising:
   providing a toilet lifting and transport device comprising:
   a frame having at least one horizontal support, said at least one horizontal support extending between a pair of vertical supports;
   a screw lift having a first end coupled to said at least one horizontal support;
   a lifting strap coupled at its approximate midpoint to said screw lift;
   clasping elements coupled at both ends of said lifting strap;
   a toilet tank strap adapted to be positioned around a toilet tank;
   two rear legs rotatably joined to said frame;
   two forward legs rotatably attached to said frame; and
   wheels joined to both the rear legs and the forward legs;
   positioning said toilet lifting and transport device, in an open position, proximate to a toilet so that a toilet bowl is between said vertical supports and beneath said at least one horizontal support;
   placing said clasping elements beneath a toilet bowl rim or bridge;
   placing said toilet tank strap around said toilet tank;
   causing said screw lift to turn thereby raising said toilet; and
   transporting said toilet to a desired location.

* * * * *